C. E. SAWYER.
Label and Tag Machine.
No. 166,940. Patented Aug. 24, 1875.
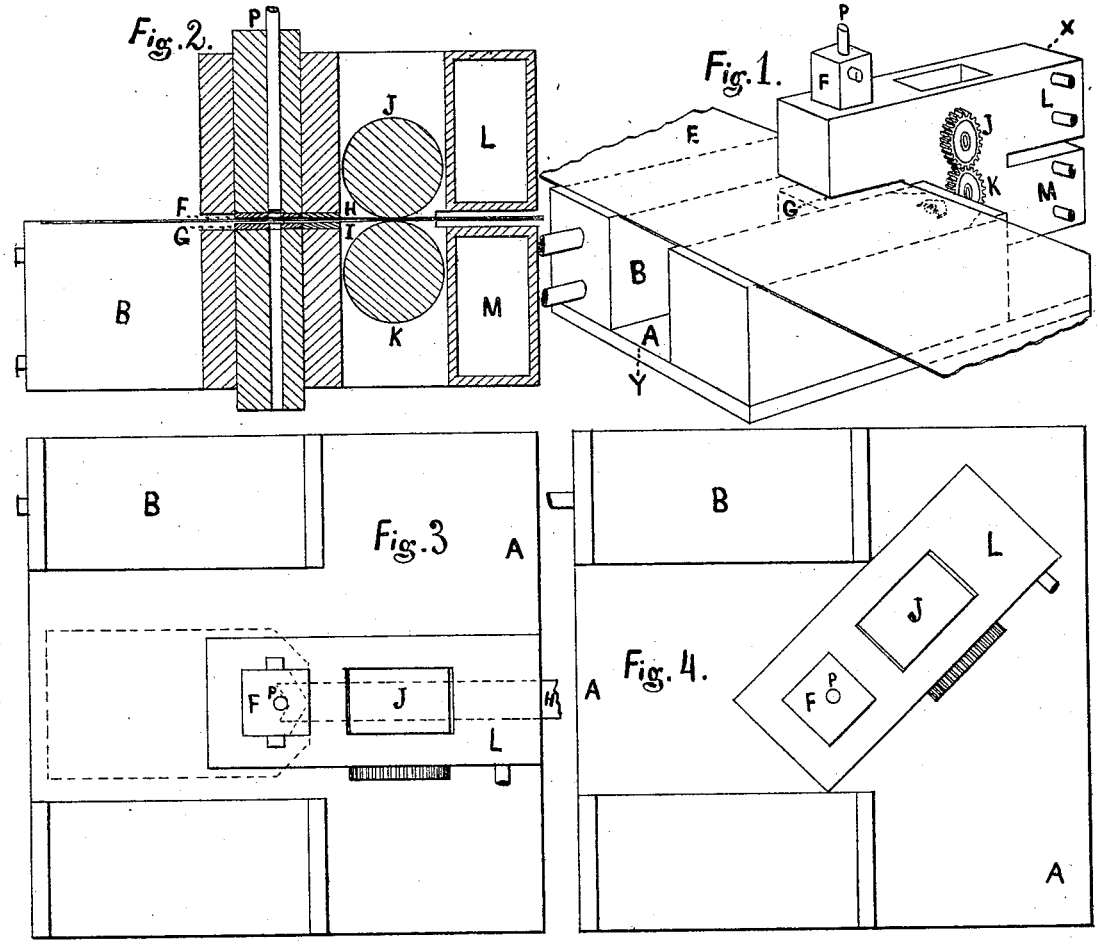

UNITED STATES PATENT OFFICE.

CHARLES E. SAWYER, OF BOSTON, MASSACHUSETTS.

IMPROVEMENT IN LABEL AND TAG MACHINES.

Specification forming part of Letters Patent No. 166,940, dated August 24, 1875; application filed February 10, 1874.

*To all whom it may concern:*

Be it known that I, CHARLES E. SAWYER, of Boston, in the county of Suffolk and State of Massachusetts, have invented certain new and useful Improvements in Label and Tag Machines, of which the following is a specification:

My invention relates to that class of machines for making paper tags, wherein an additional piece or patch is gummed or cemented to each side of the tag, in order to strengthen the eye of the same.

The objects of my invention are to increase the working capacity of such machines, and to greatly reduce the cost of such tags, and further strengthen the eyes of the same, and use patches of such form as can be cut without any waste of material, and cemented to the tag at such point as to make available the entire strength of the patch, against tearing out the eye of the tag, and, further, to employ heat to soften the gum or cement, especially when shellac is used to adhere the strengthening-patch to the tag or label; and it consists in providing steam-boxes, arranged in such manner as to heat the gum-strips, partially softening the gum upon the same, but not sufficiently to cause them to stick or adhere together, and then complete such softening by heating the tag or label stock itself, so as to cause the two to unite firmly and quickly when brought together by pressure, preventing thereby the tendency of the patch to swell and warp, as is the case when the gum is reduced by alcohol or moisture sufficiently to adhere. My invention further consists in the form of the dies or cutters for cutting off from a continuous strip of strengthening material patches contiguous to each other without any waste of material intervening; and, further, in feeding the gum-strips diagonally to the tag or label, or the strip or stock from which they are to be cut, when using a square patch, set on diagonally with the tag, and the eye cut through the same.

When the tags or labels are designed to be used without exposure to moisture, I employ sponges to moisten the gum used for sticking the patches on or around the eye of the same. These may be used with or without the steam heating-boxes. Being supplied with moisture, they soften the gum upon the patch-strip, when gums or glue are used that can be dissolved in water.

Figure 1 is a perspective view of my invention as arranged for feeding the gum-strips at a right angle with the tag. Fig. 2 is a vertical central section through Fig. 1, as shown by dotted lines $x\,y$. Fig. 3 is a top plan view, showing the tag and gum strips in dotted lines. Fig. 4 is a similar view, with the feed-rolls set diagonally, so as to apply square patches. Fig. 5 shows forms of dies or cutters, 6, 7, 8, 9, and 10.

A is the frame of the machine, on the top of which is placed a steam-box, B, having inlet-pipe C and outlet-pipe D. Suitable mechanism is provided to feed along the tag or label stock E. It, passing over the steam-box B, is heated as required. When it reaches the cutters or dies F and G its motion ceases, and the patch-stock or gum-strips H and I are fed between the upper and lower cutters or dies F G. By means of the feed-rolls J and K the cutters or dies F G are brought toward each other, each cutting a patch from the gum-strips H and I which have passed in contact with the heating-boxes L M. Such patches are, while hot, pressed against each side of tag-strip or stock E near its edge, which, being hot, melts the gum, and it adheres under pressure instantly. Then the eye-punch P passes down through the tag or label stock and forms a small round hole. When the whole moves along the width of another tag a corner cutter comes down and cuts a triangular piece from the edge of the tag-strip, when a knife or shears severs the same from the strip, thus forming a tag. Suitable mechanism, well known, is employed to give the proper intermittent motions to the several parts, being driven by hand or other power.

Fig. 5 shows several forms of dies or cutters which will cut the patches from the gum-strip, contiguous to each other, without waste of the material. These patches are designed to partially surround the eye of the tag, as shown; but if it is desirable to have the eye cut through the center of the patch, the cutters are adjusted diagonally to the tag-stock, as shown in figure. This will admit of a square patch being cut from the strip, as in the former method, and cemented to the tag or label diagonally, being stronger of the same size than if attached parallel with the sides of the tag.

Having thus described my invention, what I claim is—

1. The combination of the heating-box B with the cutters or dies F and G, or their equivalents, constructed substantially in the manner described, as and for the purposes set forth.

2. The combination of heating-boxes L and M, with feed-rolls J K and dies F G, or equivalents, constructed substantially in the manner described, as and for the purposes set forth.

3. The combination of the heating-box B with the feed-rolls J and K, dies F and G, heating-boxes L and M, constructed to operate substantially in the manner described, as and for the purposes set forth.

CHARLES E. SAWYER.

Witnesses:
SYLVENUS WALKER,
WM. A. CLOUTMAN.